US005765472A

United States Patent [19]

Kim

[11] Patent Number: 5,765,472

[45] Date of Patent: Jun. 16, 1998

[54] FRUIT AND VEGETABLE HAND SLICER

[76] Inventor: Sun Y. Kim, 2384 Lancaster Ct., Hayward, Calif. 94542

[21] Appl. No.: 895,108

[22] Filed: Jul. 16, 1997

Related U.S. Application Data

[63] Continuation of Ser. No. 797,403, Feb. 10, 1997, abandoned.

[51] Int. Cl.[6] ........ A47J 43/06; A47J 44/00; B26D 3/26; B02C 19/00

[52] U.S. Cl. ........ 99/537; 83/167; 83/856; 83/857; 83/932; 99/588

[58] Field of Search ........ 99/495, 537, 538, 99/499–508, 588; 83/167, 856–858, 932; 241/100, 94, 273.1, 292.1; 30/279.2, 279.6, 280, 283, 122, 278, 304; D7/678, 695

[56] References Cited

U.S. PATENT DOCUMENTS

| | | | |
|---|---|---|---|
| 161,920 | 4/1875 | Witmer | 83/587 |
| 2,035,111 | 3/1936 | Behrman | 30/59 |
| 2,715,927 | 8/1955 | Cupper et al. | 99/537 X |
| 4,212,431 | 7/1980 | Doyel | 241/100 |
| 4,290,196 | 9/1981 | Borner | 30/279.6 |
| 4,436,011 | 3/1984 | Jones | 99/537 X |
| 4,733,588 | 3/1988 | Yamamoto | 83/857 |
| 4,733,589 | 3/1988 | Wolff | 83/858 |
| 5,075,973 | 12/1991 | Borner | 30/279.6 |
| 5,088,392 | 2/1992 | Ancona et al. | 99/499 |
| 5,148,731 | 9/1992 | Boerner | 83/932 X |
| 5,445,332 | 8/1995 | Shimizu et al. | 99/588 X |
| 5,478,018 | 12/1995 | Wang | 241/100 |

OTHER PUBLICATIONS

*Super Slicer*, Telebrands, (no date) One American Way, Roanoke, VA 24016.

*3–Pc. Mandolin Garlic Slicer*, 1994, Progressive International Corp., Seattle, WA 98108.

*Primary Examiner*—Timothy F. Simone

*Attorney, Agent, or Firm*—Bielen, Peterson & Lampe

[57] ABSTRACT

A food slicer for slicing a variety of food items, the food slicer having a cutting platform with a housing supporting an adjustable sizing plate, fixed horizontal cutting blade and a receiving plate flush with the cutting blade, the housing having a guide for a food transport sled, the transport sled having a food item guide conduit providing a well for receiving food items to be sliced, and a flange slidably engageable with the housing guide, the food items being sliced when the transport sled is displaced from over the sizing plate, across the cutting blade to the receiving plate, the food slicer having a food container on which the cutting platform is seated to receive the food slices.

7 Claims, 2 Drawing Sheets

FRUIT AND VEGETABLE HAND SLICER

This application is a continuation of application No. 08/797,403 filed 2/10/97, now abandoned.

BACKGROUND OF THE INVENTION

This invention relates to a food slicer for slicing a variety of foods including dried meats and fresh fruit. Many different devices have been devised for the commercial and household preparation of foods. Although specialty purpose slicers and graters have been devised, for example, for garlic cloves, a general purpose slicer that is designed for safely slicing a variety of different foods has not been encountered.

Because slicing of food stuff can be a dangerous matter, a device that is both efficient and safe is prized. The utility food slicer described in this application is a mechanical device that is useful in the home as well as in commercial establishments. The mechanical actuating mechanism is both natural and efficient to effect the desired reciprocal action that generates the slice. The utility slicer of this invention utilizes a reciprocating sled that carries a container with a well sized for the type of food being sliced. The food slicer of this invention is particularly adept at slicing tender fruit such as strawberries without crushing the fruit. This is accomplished by the gravity feed guide that orients and contains the food during slicing. These and other features will become apparent from the construction of the universal food slicer described in this application.

SUMMARY OF THE INVENTION

The food slicer of this invention comprises a food processing mechanism that is particularly adapted for manual use. The slicer apparatus includes three primary components. A cutting platform, on which is mounted a mechanism for positioning a cutting blade including means for adjusting the position of a food sizing plate relative to the blade; a base container on which the cutting platform is preferably mounted to receive the cut slices from the cutting platform; and, one of preferably several, food transport sleds that cooperates with the cutting platform to slide food over the cutting blade to slice the food item contained in the well of the transport sled. During the slicing operation, the three primary components are integrated into a single unit. The cutting platform seats on the base container like a cover, and the selected food transport sled engages a guide on the cutting platform to enable a reciprocating travel of the transport sled over the cutting blade in the cutting platform.

The food transport sled is preferably selected from one or more transport sleds having a food item receiving well sized or configured for orienting a particular food item with relationship to the cutting platform during the slicing operation. A preferred embodiment of the transport sled includes a rectangular guide conduit having a removable partition to sub-divide the guide conduit into four well sectors for orienting small or elongated food items with respect to the cutting platform. With the partition removed, the guide conduit forms a single well that is suitable for larger items. Where the food slicer is marketed with only a single transport sled, the convertible, multi-sector sled is preferred.

In the preferred embodiment of the food slicer, the cutting platform has an adjustment mechanism for repositioning a food sizing plate relative to the blade for a range of slicing thicknesses. In this manner, the versatility is greatly improved allow thin shavings or relatively thick slices.

The preferred embodiments of the food slicer are described in greater detail in the Detailed Description of the Preferred Embodiments.

DETAILED DESCRIPTION OF THE PREFERRED EMBODIMENTS

Figure 1:
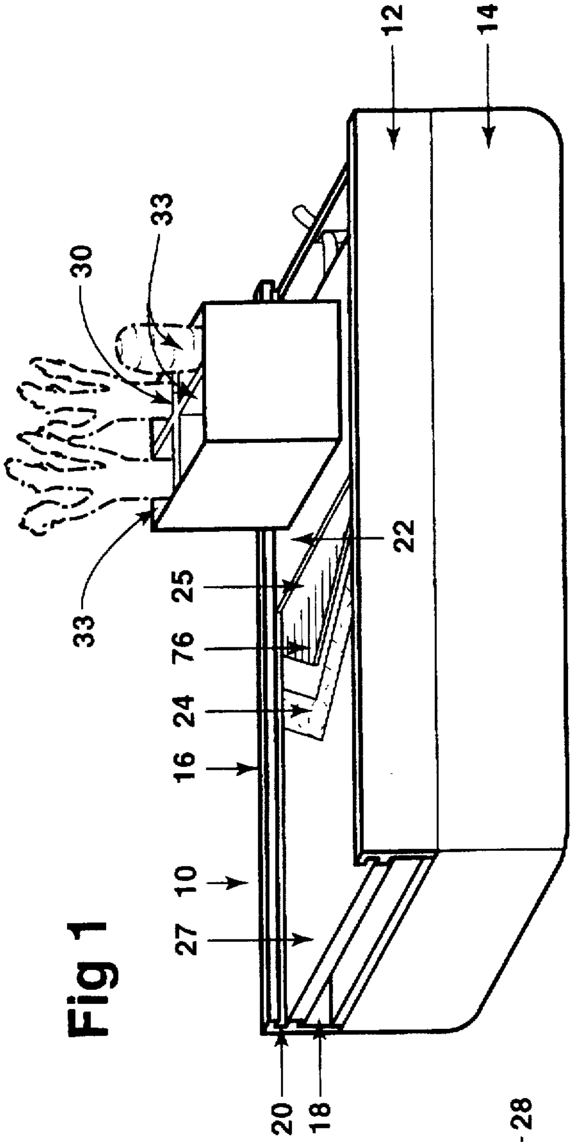
FIG. 1 is a perspective view of the food slicer unit having a transport sled with multiple food wells.

Referring to the perspective view of FIG. 1, the universal food slicer unit is designated generally by the reference numeral 10. The slicer unit 10 includes a cutting platform 12 that is seated on a food container 14 for conveniently collecting the slices of the food item being processed. The cutting platform 12 has a perimeter housing 16 that has inner walls 18 with opposed guide grooves 20 for slidably engaging a transport sled 22. The housing 16 also provides a support frame for a cutting blade 24 and an adjustable sizing plate 25 positioned adjacent the cutting blade 24. The transport sled 22 slides over the sizing plate 25 and cutting blade 24. Food contained within a well 26 formed by a guide conduit 28 is sliced during each forward passage over the blade 24. The cutting blade 24 is mounted flush with a stationary receiving plate 27 that supports the remaining food item at the end of the cutting stroke.

Figure 2:
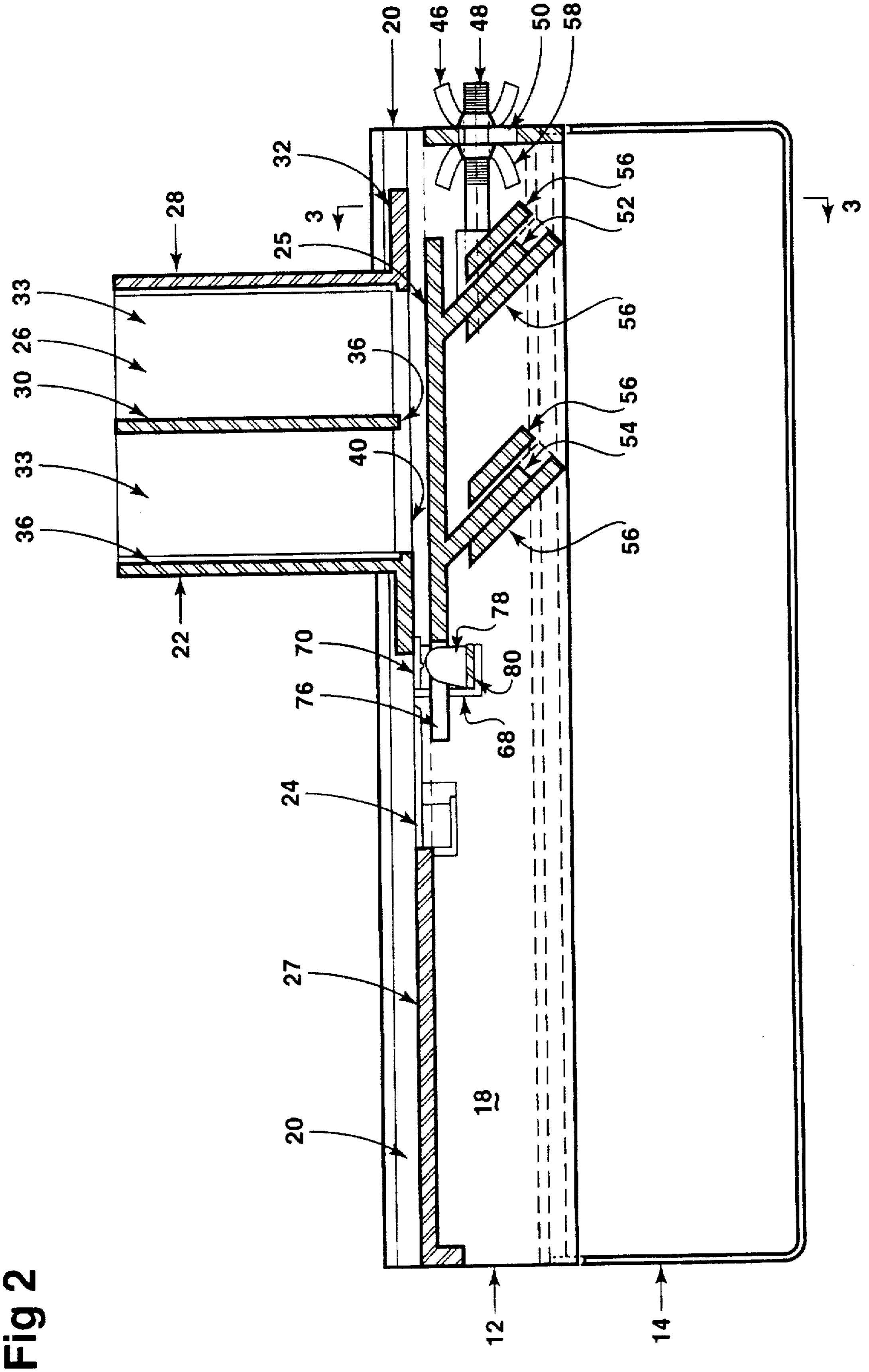
FIG. 2 is a side elevational, cross-sectional view of the food slicer unit of FIG. 1.

In FIGS. 1 and 2 the preferred transport sled 22 has guide conduit 28 that is rectangular in configuration and includes a removable partition 30. The partition 30 when installed in the guide conduit 28 divides the well 26 formed by the guide conduit 28 into four sectors 33 to hold multiple food items, as shown in phantom in FIG. 1 using the examples of carrots and celery stalks.

Figure 4:
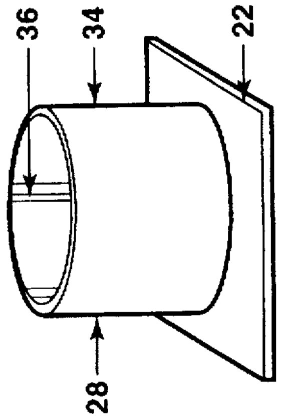
FIG. 4 is a perspective view of an alternate embodiment of the transport sled.
Figure 3:
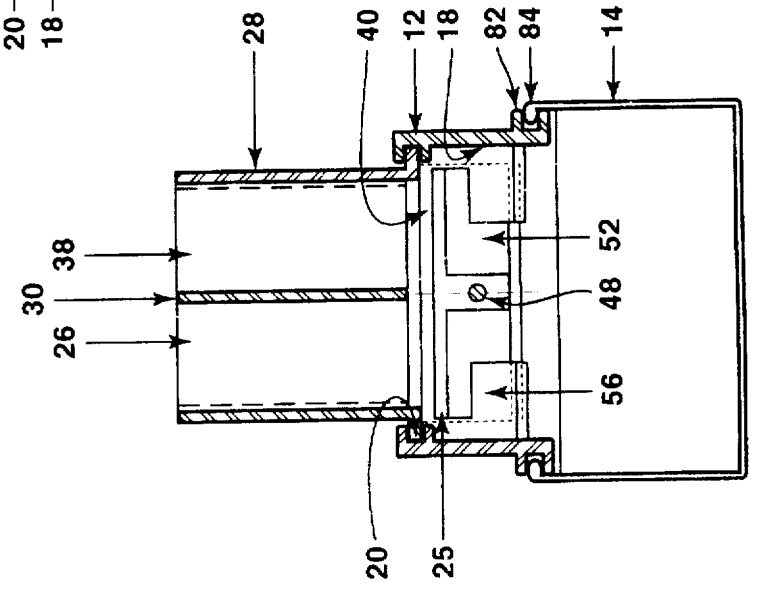
FIG. 3 is a cross-sectional view taken on the lines 33 in FIG. 2.

Referring to FIGS. 1–4, the typical construction of the transport sled 22 has the guide conduit 28 fixed to a slide plate 32 which is sized to span the cutting platform 12 and engage the guide grooves 20. As shown in the cross-sectional views of FIGS. 2 and 3, the slide plate 32 is constructed as a square flange around the guide conduit 28 leavening an open well 26 to provide a passage to the sizing plate 25 of the cutting platform 12. The guide conduit 28 can have a different configuration, such as the cylindrical segment 34 as shown in FIG. 4. The diameter of the cylindrical segment 34 comprising the guide conduit 28 of the transport sled 22 in FIG. 4 is sized to accommodate typical food items such as apples, onions, and other round or cylindrical food items. Transport sleds with different configurations of the guide conduits can be provided for different sized food items as it is preferred that the conduit be sized to the general size of the food item being sliced for best results.

In the transport sled 22 of FIGS. 2 and 4, the interior walls 34 of the guide conduit 28 have grooves 36 to accommodate the splines 38 of the removable partition 30. The grooves 36 terminate above the bottom edge 40 of the transport sled 22 to prevent the removable partition 30 from contacting the blade 24 of the cutting platform 12. When the transport sled 22 is installed on the cutting platform with the guide conduit 28 positioned over the sizing plate 25, food items placed in the guide conduit 28 rest on the sizing plate by gravity. Upon sliding the transport sled 22 over the cutting blade 24, by manually pushing the guide conduit 28 connected to the transport sled 22, the food items encounter the cutting blade 24 and are sliced.

The cutting blade 24 is connected to and flush with the receiving plate 27 which is attached to the inside walls 18 of the housing 16 of the cutting platform 12. The food items remaining in the guide conduit 28 slide over the cutting blade 24 and onto the receiving plate 27 during the cutting stroke. On the return stroke, the food items drop by gravity to the lower sizing plate 25, ready for the next stroke.

At one end of the cutting platform 12 is an adjustment nut 46 connected to a threaded screw 48 for adjusting the position of the sizing plate 25 when the adjustment nut 46 is rotated. Approximately one rotation of the adjustment nut 46 will raise or lower the sizing plate 25 within its approximately one-quarter inch range for cutting food items carried by the transport sled 22. As shown in the cross sectional view of FIG. 2, the nut 46 threads to the screw 48 which passed through a vertically elongated hole 50 in the housing 16 and is fixed to an inclined depending tongue 52 on the underside of the sizing plate 25. The tongue 52 and a parallel companion tongue 54 are slidable between opposed pairs of spaced bracketing guides 56 which are fixed to the inside walls 18 of the housing 16. The incline is preferably at a 45° angle so that a unit of lateral displacement of the screw will result in an equal unit of vertical displacement of the sizing plate 25. The adjustment nut 46 is maintained against the housing by a locking nut 58 which must be loosened when making adjustments. The adjustment nut 46 and locking nut 58 are conventional wing nuts, allowing manual adjustment when the cutting platform 46 is removed from the food container 14. Turning the adjustment nut 46 displaces the sizing plate 25 relative to the cutting blade 24. The cutting blade 24 is preferable angled across the span of the cutting platform 12 to provide a shear when cutting, and, in the preferred embodiment shown, the cutting blade 24 is v-shaped.

Figure 5:
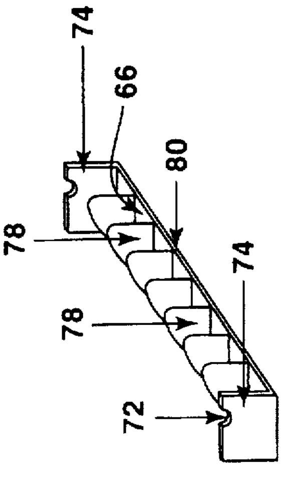
FIG. 5 is a perspective view of a cutting comb installable in the housing.

When it is desired to make potato strings or other such items, a cutting comb 66 as shown in FIG. 5 is installed on an L-shaped tab 68 projecting from the housing wall 18 under a small spring clip 70 which engages the top 72 of the end members 74 on the comb 66 to retain the comb in the slicer unit. The adjustable sizing plate 25 has a series of slits 76 to accommodate a series of vertical cutting blades 78 mounted to a cross bar 80 when the cutting comb 66 is installed as shown in FIG. 2.

It is to be understood that other implements may be added to the slicer unit to vary its use as a universal slicer unit without changing the basic operation. Additionally, the cutting platform 12 has a base rim 82 that engages a top rim 84 on the container to couple to components together for convenient use. However, the cutting platform may be used on a cutting board surface or other container with good results without the container.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A food slicer unit for slicing a variety of food items comprising:

a cutting platform including a housing, a first support surface for food items horizontally supported by the housing, and a second support surface for food items horizontally supported by the housing having a cutting blade adjacent to the first support surface, wherein the first support surface is positioned lower than the second support surface;

a transport sled having an open conduit member forming a well, and a flange member, wherein the housing of the cutting platform has guide means slidably engaging the flange member of the transport sled for guiding the horizontal displacement of the transport sled over the food item support surface, the cutting blade, and the second support surface, wherein food items placed in the well of the sled are sliced when the transport sled is displaced.

2. The food slicer unit of claim 1 wherein the conduit member forming the well has a size and configuration to retain food items for gravity seating on the first support surface before displacement of the transport sled and slicing of the food items by the cutting blade.

3. The food slicer unit of claim 2 wherein the conduit means has a divider dividing the conduit means into a plurality of sectors for select placement of food items.

4. The food slicer unit of claim 1 having adjustment means for adjusting the horizontal position of the first support surface relative to the second support surface.

5. The food slicer unit of claim 1 having a food slice collection container with means to connect the food slice container with the cutting platform.

6. The food slicer unit of claim 1 having a blade means mountable to the cutting platform for slitting food items being sliced.

7. The food slicer unit of claim 1 wherein the housing has elongated guide means for guiding the transport sled and the transport sled has a flange member connected to the open conduit member, the flange member engaging the guide means of the housing.

* * * * *